(12) United States Patent
Perry

(10) Patent No.: US 10,075,050 B2
(45) Date of Patent: Sep. 11, 2018

(54) SWITCHED RELUCTANCE MOTOR AND SWITCHED RELUCTANCE APPARATUS FOR HYBRID VEHICLES

(71) Applicant: Charles Hampton Perry, Murfreesboro, TN (US)

(72) Inventor: Charles Hampton Perry, Murfreesboro, TN (US)

( * ) Notice: Subject to any disclaimer, the term of this patent is extended or adjusted under 35 U.S.C. 154(b) by 0 days.

(21) Appl. No.: 14/487,761

(22) Filed: Sep. 16, 2014

(65) Prior Publication Data

US 2015/0084451 A1    Mar. 26, 2015

Related U.S. Application Data

(63) Continuation of application No. PCT/US2014/035344, filed on Apr. 24, 2014.

(60) Provisional application No. 61/983,901, filed on Apr. 24, 2014, provisional application No. 61/878,135, filed on Sep. 16, 2013, provisional application No. 61/878,135, filed on Sep. 16, 2013.

(51) Int. Cl.
*H02K 37/02* (2006.01)
*H02K 19/10* (2006.01)
*H02K 7/14* (2006.01)

(52) U.S. Cl.
CPC .......... *H02K 19/103* (2013.01); *H02K 7/14* (2013.01)

(58) Field of Classification Search
CPC ...... H02K 1/146; H02K 1/246; H02K 19/103; H02K 37/02; H02K 37/04
See application file for complete search history.

(56) References Cited

U.S. PATENT DOCUMENTS

| 4,475,051 A | * | 10/1984 | Chai | H02K 37/04 310/162 |
| 4,631,510 A | * | 12/1986 | Nagarkatti | H02K 29/12 310/168 |
| 4,647,802 A | * | 3/1987 | Konecny | H02K 19/103 310/162 |
| 4,794,286 A | * | 12/1988 | Taenzer | H02K 41/03 310/12.17 |
| 5,704,111 A | * | 1/1998 | Johnson | H02K 1/30 29/451 |

(Continued)

FOREIGN PATENT DOCUMENTS

| CN | 86100304 A | 1/1986 |
| CN | 201682361 U | 5/2010 |

OTHER PUBLICATIONS

PCT/US14/035344, Internal Search Report and Written Opinion (Perry et al.) (International Filing Date Apr. 24, 2014).

*Primary Examiner* — Dang Le

(74) *Attorney, Agent, or Firm* — Wayne Edward Ramage; Baker Donelson

(57) ABSTRACT

An improved hybrid drive apparatus with a switched reluctance hub motor. The switched reluctance motor eliminates any drag caused by the existing magnetic fields of the motors used in the prior art by turning off the magnetic fields when not being used. It also is cleaner and more efficient to operate, as any magnetic road dust or debris attracted during operation is dropped or repelled when the magnetic fields are turned off. An improved switched reluctance motor may be used, with a stator ring and rotor ring designed so that the low reluctance flux path does not pass through the full diameter of the rotor or rotor bars.

17 Claims, 8 Drawing Sheets

STATOR-ROTOR DETAIL VIEW

(56) References Cited

U.S. PATENT DOCUMENTS

| | | | |
|---|---|---|---|
| 5,777,416 A * | 7/1998 | Kolomeitsev | H02K 29/12 |
| | | | 310/168 |
| 5,780,997 A | 7/1998 | Sutrina et al. | |
| 5,789,883 A * | 8/1998 | Gilman | H02P 25/08 |
| | | | 318/254.2 |
| 5,856,714 A | 1/1999 | Sugiura | |
| 5,894,902 A * | 4/1999 | Cho | B60K 7/0007 |
| | | | 180/65.51 |
| 6,137,204 A * | 10/2000 | Kuwahara | H02K 24/00 |
| | | | 310/162 |
| 6,836,035 B1 | 12/2004 | Pawletko | |
| 7,230,360 B2 * | 6/2007 | Desai | H02K 19/103 |
| | | | 310/166 |
| 8,400,084 B2 | 3/2013 | Umemori et al. | |
| 8,700,239 B2 | 4/2014 | Perry et al. | |
| 2010/0231062 A1 * | 9/2010 | Sykes | H02K 3/47 |
| | | | 310/46 |
| 2013/0154397 A1 * | 6/2013 | Sullivan | H02K 21/00 |
| | | | 310/12.18 |

* cited by examiner

STATOR-ROTOR DETAIL VIEW

SWITCHED RELUCTANCE MOTOR AND SWITCHED RELUCTANCE APPARATUS FOR HYBRID VEHICLES

This application is a continuation of PCT Application No. PCT/US14/35344, filed Apr. 24, 2014, which claims benefit of and priority to U.S. Provisional Application No. 61/878,135, filed Sep. 16, 2013 by Charles Hampton Perry, entitled "Switched-Reluctance Apparatus for Hybrid Vehicles," and is entitled to those filing dates for priority in whole or in part. The application further claims benefit of and priority to U.S. Provisional Application No. 61/983,901, filed Apr. 24, 2014 by Charles Hampton Perry, entitled "Improved Switched Reluctance Motor and Switched Reluctance Apparatus for Hybrid Vehicles," and U.S. Provisional Application No. 61/878,135, filed Sep. 16, 2013 by Charles Hampton Perry, entitled "Switched-Reluctance Apparatus for Hybrid Vehicles," and is entitled to those filing dates for priority in whole or in part. The specification, figures, appendices, and complete disclosures of U.S. Provisional Application Nos. 61/983,901 and 61/878,135 and PCT Application No. PCT/US14/35344 are incorporated herein in their entireties by specific reference for all purposes.

FIELD OF INVENTION

This invention relates generally to the field of hybrid vehicles. More specifically, this invention relates to an apparatus for augmentation, storage, and conservation of vehicle motive energy for internal combustion-electric hybrid vehicles using a switched reluctance motor.

BACKGROUND OF INVENTION

Retrofitted hybrid drive systems are known in the art. A motor-generator device that can retro-fitted and installed on an internal combustion powered vehicle to add electric motive force and power to the vehicle, and thereby convert the vehicle to a hybrid, is disclosed in Perry, et al., "Machine for Augmentation, Storage, and Conservation of Vehicle Motive Energy," U.S. Pub. No. 2012/0215389, which is incorporated herein by specific reference for all purposes. Earlier hybrid drive systems also are disclosed in Lynch, et al, U.S. Pat. No. 4,165,795 and Kawakatsu, U.S. Pat. No. 4,335,429, which are incorporated herein by specific reference for all purposes as well.

However, prior art systems still can be difficult to install, and cause drag due to the presence of magnetic fields. The magnets also attract and collect road dust and debris, causing the motor to become dirty and inefficient.

SUMMARY OF INVENTION

In various exemplary embodiments, the present invention comprises an improved hybrid drive apparatus with a switched reluctance hub motor. By using a switched reluctance motor, the present invention has the advantage of eliminating any drag caused by the existing magnetic fields of the motors used in the prior art by turning off the magnetic fields when not being used. The present invention also has the advantage of being cleaner and more efficient to operate, where any magnetic road dust or debris attracted during operation is dropped or repelled when the magnetic fields are turned off.

The switched reluctance motor is a type of reluctance motor (i.e., an electric motor that runs by reluctance torque). Unlike common DC motor types, power is delivered to windings in the stator rather than the rotor. This greatly simplifies mechanical design as power does not have to be delivered to a moving part. However, some sort of switching system needs to be used to deliver power to the different windings.

In several embodiments, the switched reluctance motors has wound field coils. The rotor, however, has no magnets or coils attached. It typically comprises a solid salient-pole rotor (having projecting magnetic poles) made of soft magnetic material (e.g., laminated-steel). When power is applied to the stator windings, the rotor's magnetic reluctance creates a force that attempts to align the rotor pole with the nearest stator pole. In order to maintain rotation, an electronic control system switches on the windings of successive stator poles in sequence so that the magnetic field of the stator "leads" the rotor pole, pulling it forward. Rather than using a mechanical commutator to switch the winding current as in traditional motors, the switched-reluctance motor uses an electronic position sensor to determine the angle of the rotor shaft and solid state electronics to switch the stator windings, which also offers the opportunity for dynamic control of pulse timing and shaping.

Switched reluctance motors are designed to take advantage of the reduced reluctance in a magnetic circuit. In general, a rotor with a plurality of rotor bars rotates inside a stator ring. The interior of the stator comprises a plurality of ferromagnetic stator poles, which may be actuated by magnetic coils around the poles, thereby temporarily creating north and sole pole magnets. The rotor in an switched reluctance motor is made of ferromagnetic material that will give a low reluctance magnetic path from stator pole to stator pole. The magnetic flux path is from the actuated north pole to the actuated south pole through the corresponding rotor bar.

A significant advantage of the switched-reluctance motor is that the motor does not require permanent magnets (as in a DC brushless motor). Thus, it is simple and economical to build and works well in an environment that is dirty or contains ferromagnetic dust particles. However, a switched-reluctance motor does require a control circuit to actuate the stator poles at the correct time, which can be complex and requires a rotor position feedback, such as an optical sensor or other suitable method. Also, switched-reluctance motors can be prone to making noise as the opposite stator poles are actuated on and off, which will vibrate at an audible frequency due to the periodic alternating on/off force on the stator ring.

An improved switched-reluctance motor designed to address these deficiencies comprises a modified magnetic flux path in the rotor. The rotor is a rotor ring, and rotates inside the stator ring. The rotor ring comprises a plurality of rotor poles positioned on the outer circumference. The stator ring comprises a plurality of ferromagnetic stator poles, which may be actuated by magnetic coils around the poles, thereby temporarily creating north and sole pole electromagnets. Opposite stator poles are not actuated together as pairs; instead, north and south poles are created by actuating stator poles in the same area of the stator rings. The magnetic flux path of reduced reluctance thus travels from one actuated pole through a short distance on the stator ring to the other stator pole, and then through the rotor ring through the two corresponding rotor poles.

An example of operation of the improved switched-reluctance motor is as follows. Stator pole is actuated by its corresponding coil to produce a north electromagnet, and stator pole is similarly actuated to produce a south electromagnet. Rotor poles and are in alignment with corresponding stator poles, respectively, with a magnetic circuit flowing therethrough. This actuation of stator pairs is repeated around the stator ring, so that a number of low reluctance magnetic circuits may be created around the circumference of the motor. Stator pole electromagnet pairs may alternate north and south orientation around the ring.

The control circuit turns off the current to the actuated stator poles around the ring, and actuates the next pair of stator poles. This pulls rotor poles into alignment with next pair of stator poles, forming a new low reluctance path. The new low reluctance magnetic circuits are created around the circumference of the motor, with actuation of similar stator pairs.

This movement of the rotor moves rotor poles into position to be subsequently pulled into alignment with the original set of stator poles, when those stator poles are reactuated. This describes a two-phase switched reluctance motor, with actuation of the first set of stator poles comprising a first phase, and actuation of the second set of stator poles comprising a second phase. In this configuration, every other stator pole is actuated at a time (i.e., there is an unactuated stator pole between each actuated stator pole in the actuated pair). The motor may also comprise a three phase configuration, or more, depending on the spacing of the poles and the timing of actuation.

The present design will allow a very simple drive system in that a single phase variable frequency AC signal will drive the motor. The ability to drive the present motor with a single phase AC signal does not limit the option of arranging the stator and rotor poles to drive the stator pole electromagnets with one, two, or three phase AC.

Another application of the present design is to function as a switched reluctance stepper motor. If the electrical current in the first set of stator poles is DC, the rotor will be held in one fixed position. If the DC current in this set of stator poles is turned off, and a DC current is applied to the next set of stator poles, the rotor will rotate counterclockwise and stop. With the appropriate spacing and geometry of the rotor and stator poles, and suitable application of correctly timed electrical current, the present switched reluctance motor can serve as a stepper motor as well as a variable speed motor.

While the above embodiments include radial flux pathways, the present invention comprises other possible configurations where the flux path does not run through the full diameter of the rotor or rotor bars. For example, a switched reluctance motor can comprises n axial flux configuration. The rotor poles in this embodiment are magnetic steel and not permanent magnets (representing a significant advantage over a DC brushless design).

The improved switched reluctance motor designs described above are particular well-suited for low rpm (e.g., around 2000 rpm or below), high torque applications, including, but not limited to, wheel hub motors. The rpm is low because the motor is direct drive to the wheel. High starting torque is desirable.

The noise generated by the improved switched reluctance motor design in accordance with the present invention will be less than prior art designs. The force acting on the stator will always be constant as the attractive magnetic force between the actuated stator poles and corresponding rotor poles will never completely go to zero because of how the motor operates. This will reduce the tendency for vibration in the stator ring.

DETAILED DESCRIPTION OF EXEMPLARY EMBODIMENTS

Figure 1:
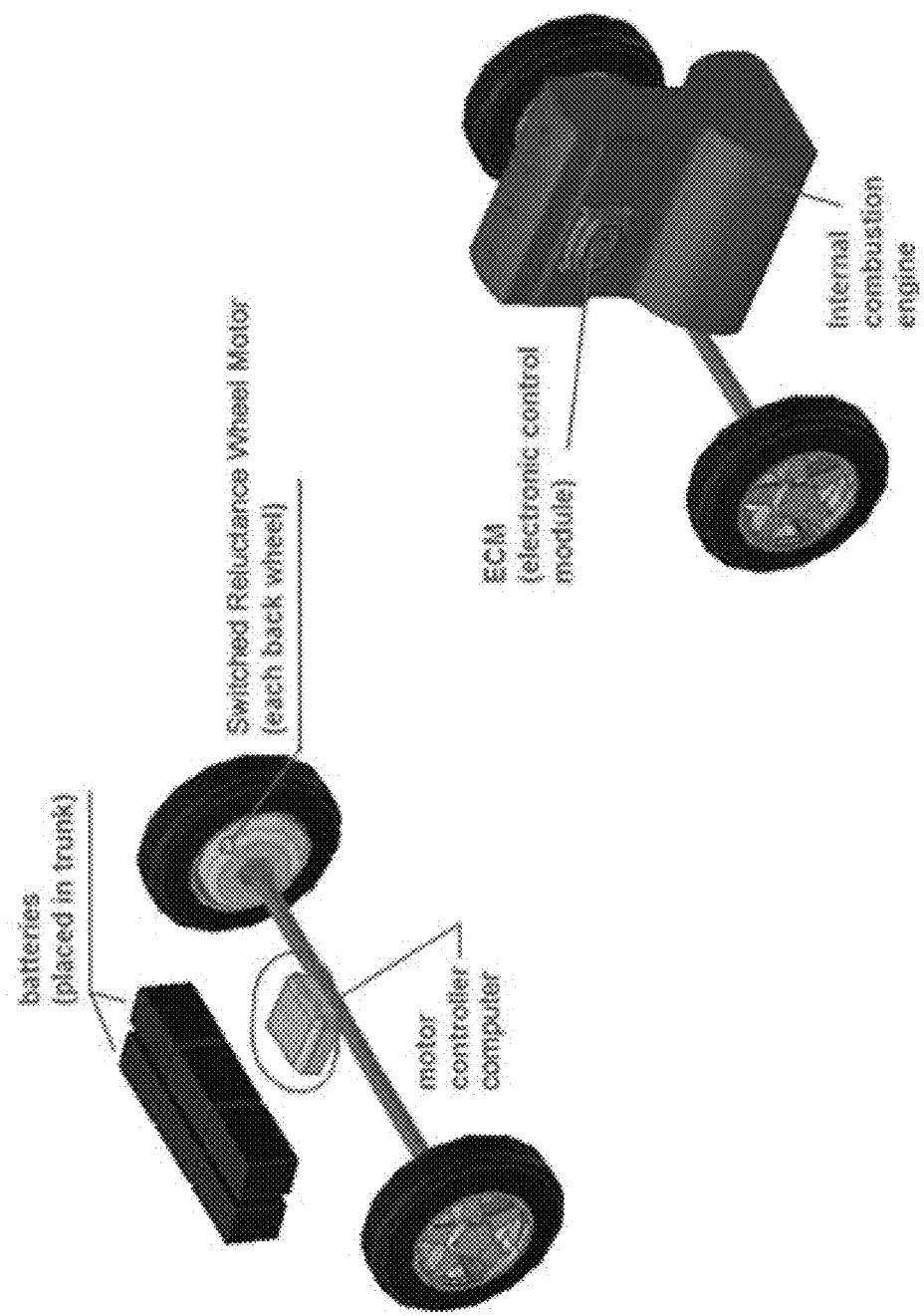
FIG. 1 shows a view of a system in accordance with an embodiment of the present invention.
Figure 2:
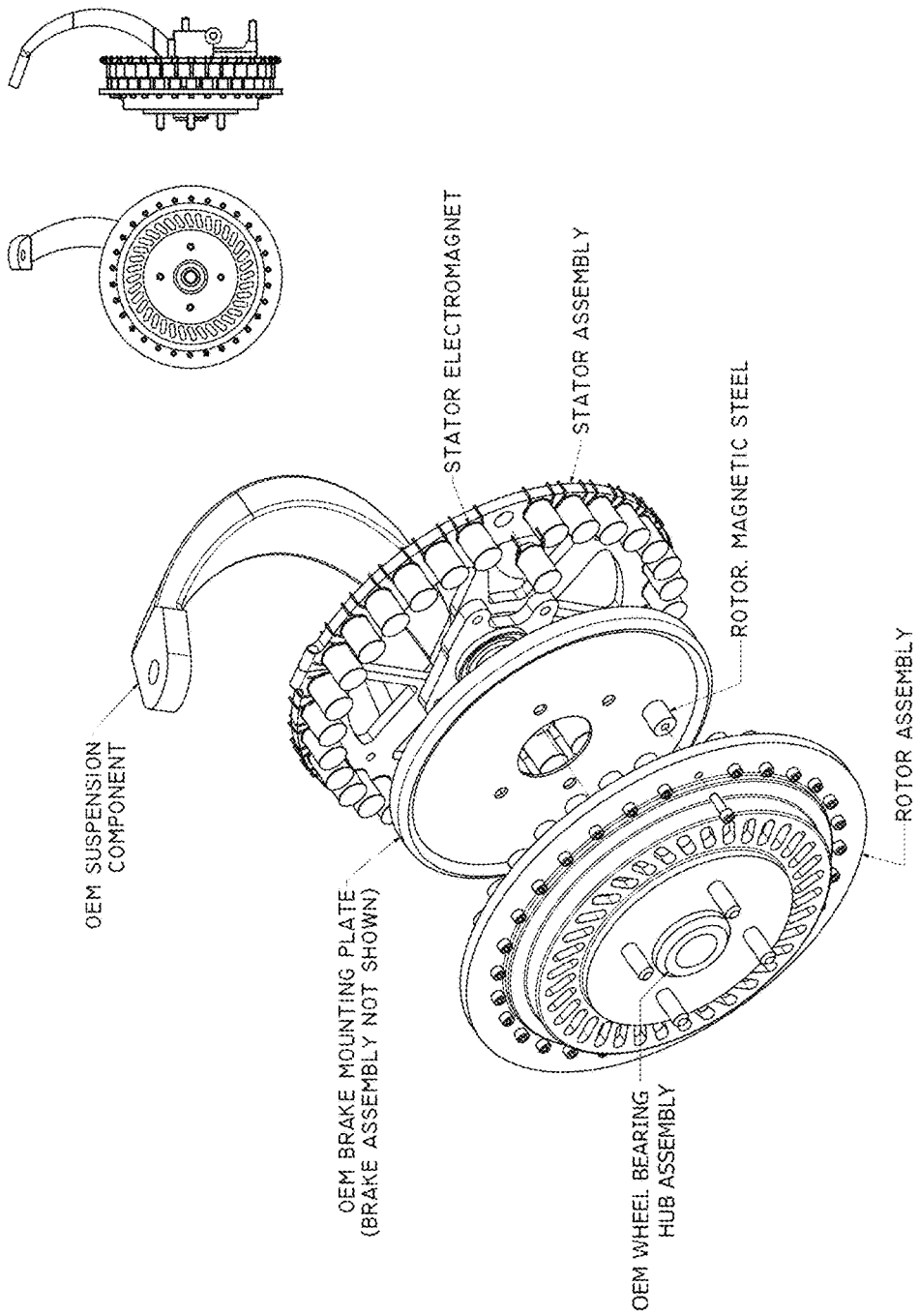
FIG. 2 shows a view of an apparatus in accordance with an embodiment of the present invention.

The present invention is an improved hybrid drive apparatus comprising a switched reluctance hub motor, as shown in FIGS. 1 and 2. By using a switched reluctance motor, the present invention has the advantage of eliminating any drag caused by the existing magnetic fields of the motors used in the prior art by turning off the magnetic fields when not being used. The present invention also has the advantage of being cleaner and more efficient to operate, where any magnetic road dust or debris attracted during operation is dropped or repelled when the magnetic fields are turned off.

The switched reluctance motor is a type of reluctance motor (i.e., an electric motor that runs by reluctance torque). Unlike common DC motor types, power is delivered to windings in the stator rather than the rotor. This greatly simplifies mechanical design as power does not have to be delivered to a moving part. However, some sort of switching system needs to be used to deliver power to the different windings.

In several embodiments, the switched reluctance motors has wound field coils. The rotor, however, has no magnets or coils attached. It typically comprises a solid salient-pole rotor (having projecting magnetic poles) made of soft magnetic material (e.g., laminated-steel). When power is applied to the stator windings, the rotor's magnetic reluctance creates a force that attempts to align the rotor pole with the nearest stator pole. In order to maintain rotation, an electronic control system switches on the windings of successive stator poles in sequence so that the magnetic field of the stator "leads" the rotor pole, pulling it forward. Rather than using a mechanical commutator to switch the winding current as in traditional motors, the switched-reluctance motor uses an electronic position sensor to determine the angle of the rotor shaft and solid state electronics to switch the stator windings, which also offers the opportunity for dynamic control of pulse timing and shaping.

Figure 3:
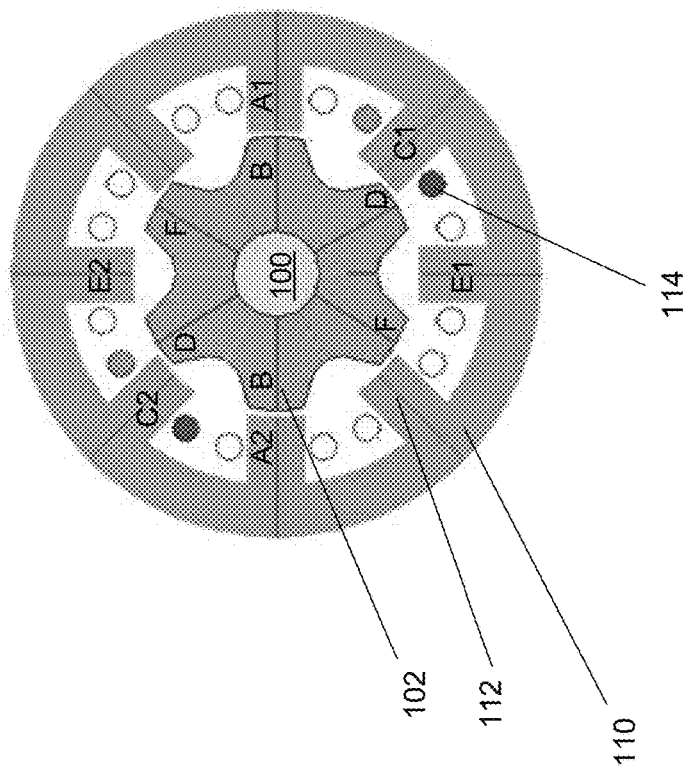
FIG. 3 shows a view of a switched reluctance motor with a central rotor with rotor bars.

An example of a switched-reluctance motor is seen in FIG. 3. Switched reluctance motors are designed to take advantage of the reduced reluctance in a magnetic circuit. In general, a rotor 100 with a plurality of rotor bars 102 rotates inside a stator ring 110. The interior of the stator comprises a plurality of ferromagnetic stator poles 112, which may be actuated by magnetic coils 114 around the poles, thereby temporarily creating north and sole pole magnets. The rotor in an switched reluctance motor is made of ferromagnetic material that will give a low reluctance magnetic path from stator pole to stator pole. The magnetic flux path is from the actuated north pole to the actuated south pole through the corresponding rotor bar 102.

An example of operation of the switched-reluctance motor is as follows. The stator poles at the 90 and 270 degree positions (A1, A2) are actuated by magnetic coils around the ferromagnetic poles thus creating north and south pole magnets. The magnetic flux path is from north to south poles through rotor bar (B), in alignment with the stator poles (A1, A2), which is a low reluctance path. The path of the magnetic flux is circular, from one stator pole around the circumference of the stator ring to the other stator pole, and returning through the corresponding rotor bar.

The control circuit turns off the current to the stator poles (A1, A2) and actuates the stator poles at the 315 and 135 degree positions (C1, C2). Programmable control circuits and mechanisms are well known in the art, and are readily available. Rotor bar (D), which is slightly offset from the stator poles (C1, C2), is then pulled in counterclockwise rotation by the north and south stator poles (C1, C2) just actuated. When the rotor bar (D) reaches the new position in alignment with stator poles (C1, C2), the control circuit turns off the current and turns on the current at the 0 and 180 degree stator pole positions (E1, E2), causing rotor bar (F) to be pulled in the counterclockwise direction. In each case the high reluctance that exists between two actuated stator poles is reduced by the rotor bars coming into exact alignment with the stator poles, as in the case of the horizontal rotor bar (B) and stator poles (A1, A2). By electrically actuating the stator poles in a clockwise manner the rotor bars are caused to rotate in counterclockwise manner, thereby creating a motor action. Of course, the direction of actuation (and thus, rotation) may be reversed.

As discussed above, a significant advantage of the switched-reluctance motor is that the motor does not require permanent magnets (as in a DC brushless motor). Thus, it is simple and economical to build and works well in an environment that is dirty or contains ferromagnetic dust particles. However, a switched-reluctance motor does require a control circuit to actuate the stator poles at the correct time, which can be complex and requires a rotor position feedback, such as an optical sensor or other suitable method. Also, switched-reluctance motors can be prone to making noise as the opposite stator poles are actuated on and off, which will vibrate at an audible frequency due to the periodic alternating on/off force on the stator ring.

Figure 4:
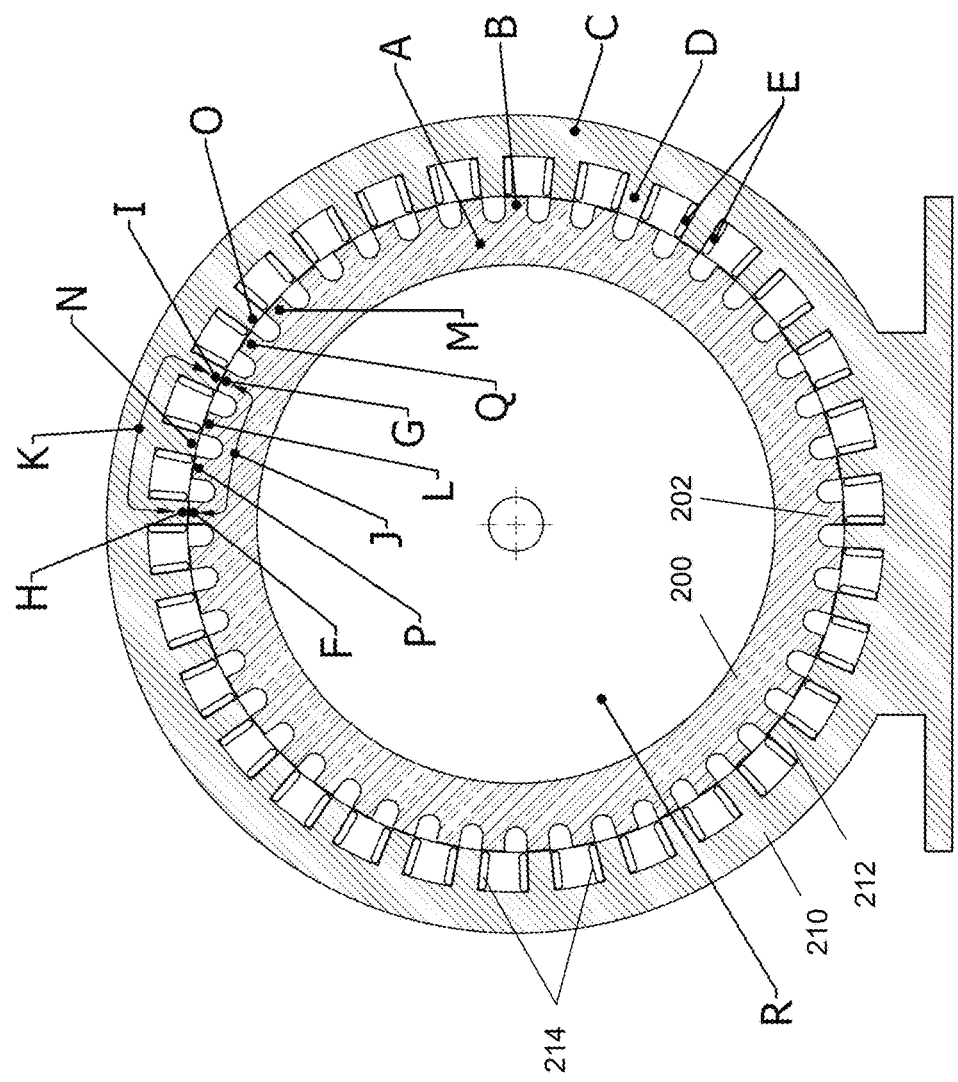
FIG. 4 shows a view of a switched reluctance motor with a rotor ring.
Figure 5:
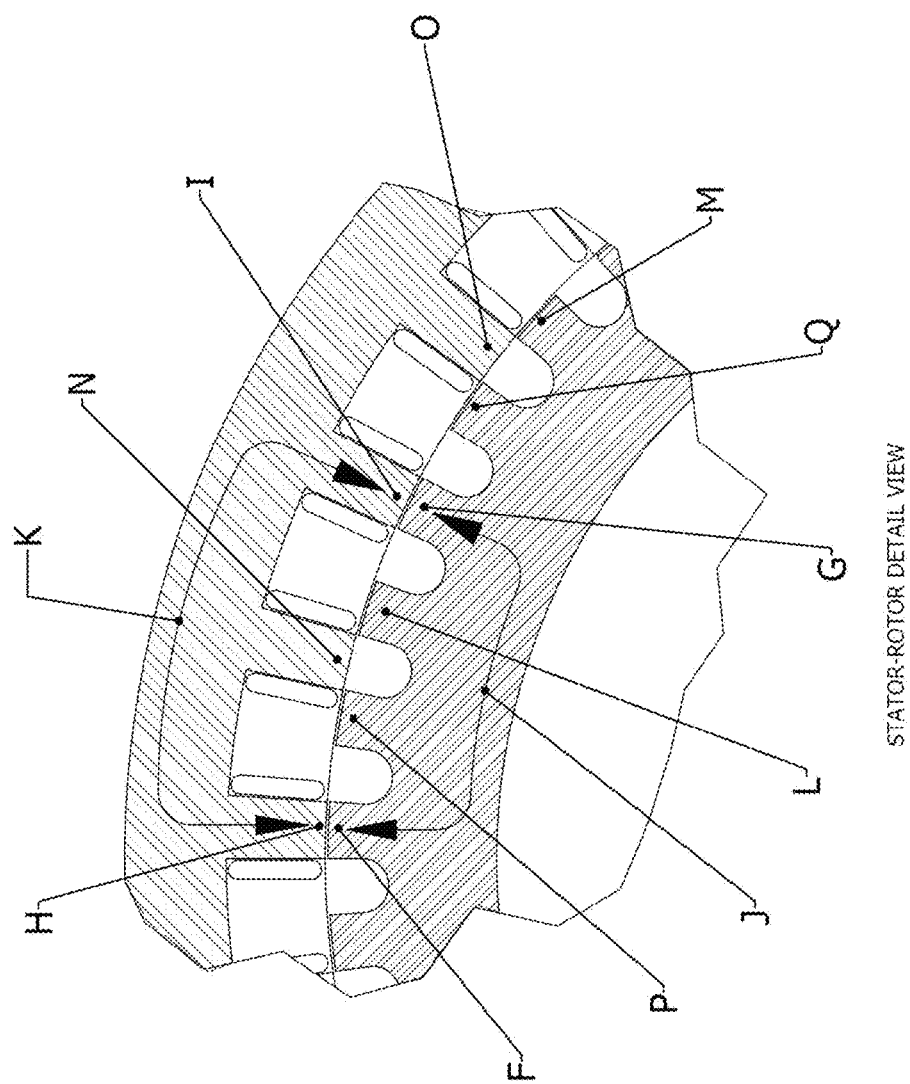
FIG. 5 shows a close-up view of a section of FIG. 4.

An improved switched-reluctance motor designed to address these deficiencies is described below. In several embodiments, the improved motor comprises a modified magnetic flux path in the rotor, as seen in FIG. 4. The rotor is a rotor ring 200, and rotates inside the stator ring 210. The rotor ring comprises a plurality of rotor poles 202 positioned on the outer circumference. The stator ring comprises a plurality of ferromagnetic stator poles 212, which may be actuated by magnetic coils 214 around the poles, thereby temporarily creating north and sole pole electromagnets. Opposite stator poles are not actuated together as pairs; instead, north and south poles are created by actuating stator poles in the same area of the stator rings. The magnetic flux path of reduced reluctance thus travels from one actuated pole through a short distance on the stator ring to the other stator pole, and then through the rotor ring through the two corresponding rotor poles, as seen in FIGS. 4 and 5.

An example of operation of the improved switched-reluctance motor is as follows. Stator pole (H) is actuated by its corresponding coil to produce a north electromagnet, and stator pole (I) is similarly actuated to produce a south electromagnet. Rotor poles (F) and (G) are in alignment with stator poles (H) and (I), respectively, with a magnetic circuit flowing therethrough. The path of the reduced reluctance in the rotor ring (A) is shown by arrow (J), while the path in the stator ring (D) is shown by arrow (K). Note that this actuation of stator pairs is repeated around the stator ring, so that a number of low reluctance magnetic circuits (15, in this configuration) may be created around the circumference of the motor. Stator pole electromagnet pairs may alternate north and south orientation around the ring.

Figure 6:
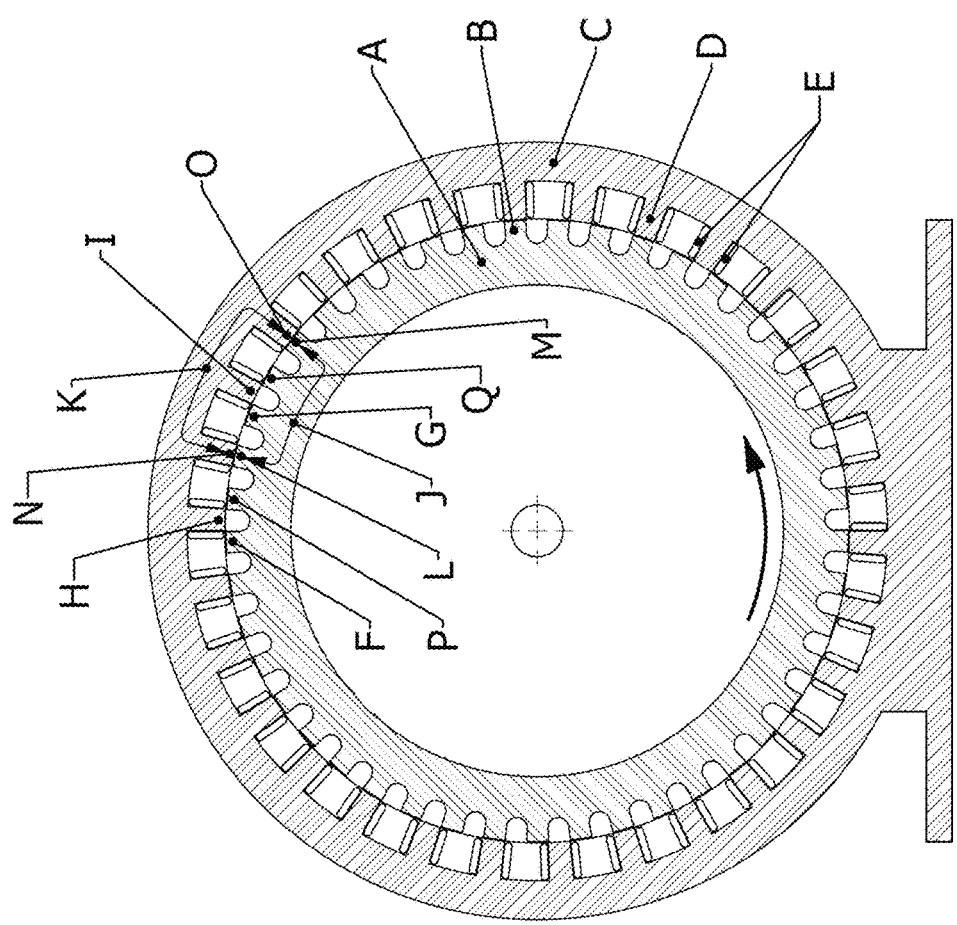
FIG. 6 shows a view of the switched reluctance motor of FIG. 4, with the rotor moved to a second position.

The control circuit turns off the current to the stator poles (H, I) (and the other actuated stator pole pairs around the ring), and actuates the stator poles (N, O). This pulls rotor poles (L, M) into alignment with stator poles (N, O), as seen in FIG. 6, forming a new low reluctance path through L, N, O, M and the intervening stator ring and rotor ring sections. Note that new low reluctance magnetic circuits are created around the circumference of the motor, with actuation of similar stator pairs.

This movement of the rotor moves rotor poles (P, Q) into position to be subsequently pulled into alignment with stator poles (H, I), when those stator poles are reactuated. This describes a two-phase switched reluctance motor, with actuation of (H, I) comprising a first phase, and actuation of (N, O) comprising a second phase. In this configuration, every other stator pole is actuated at a time (i.e., there is an unactuated stator pole between each actuated stator pole in the actuated pair). Note that the motor may also comprise a three phase configuration, or more, depending on the spacing of the poles and the timing of actuation.

Figure 7:
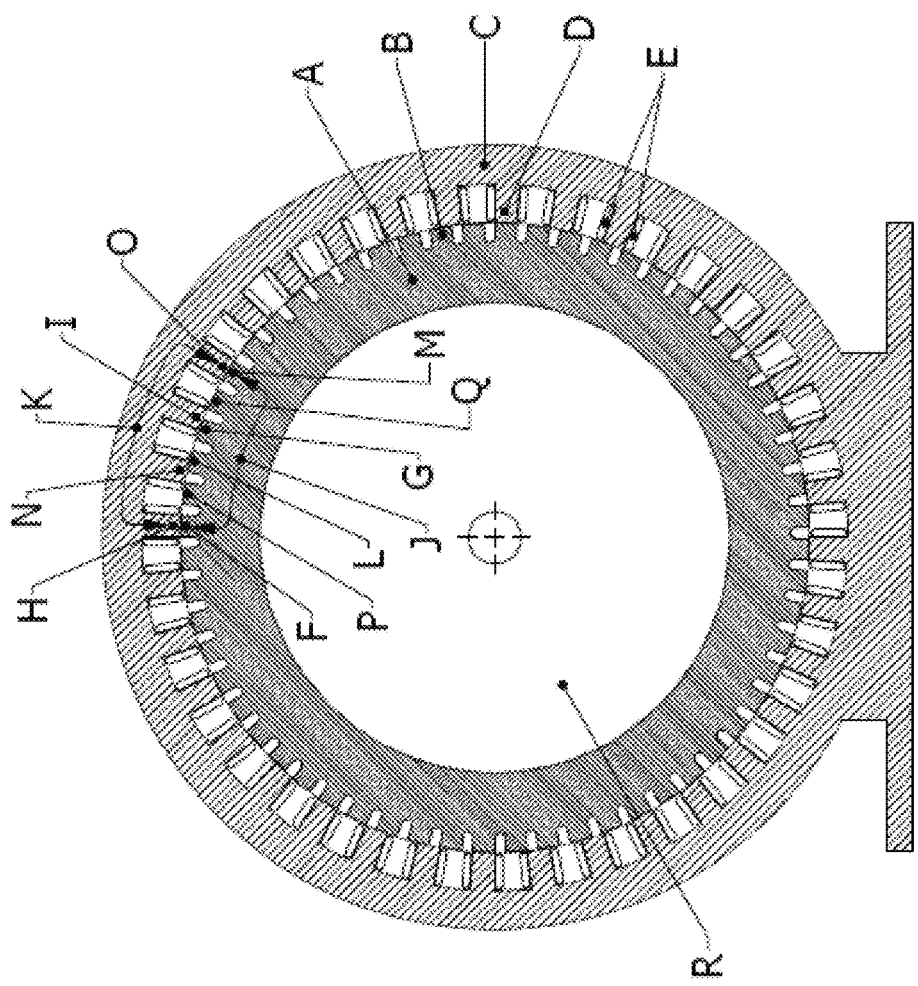
FIG. 7 shows an alternative configuration of a switch reluctance motor with a rotor ring.

FIG. 7 shows an example of a three-phase switched reluctance motor, where there are three pairs of stator poles actuated in sequence. Every third stator pole is actuated at a time (i.e., there are two unactuated stator pole between each actuated stator pole in the actuated pair).

The central region (R) may be a mechanical support for the rotor ring, and comprises a non-ferromagnetic material, such as, but not limited to, aluminum, brass, carbon fiber, or other suitable material. It positions the rotor in the in correct position relative to the stator poles, and assists in providing rotation about a shaft through the center of the rotor assembly.

Figure 8:
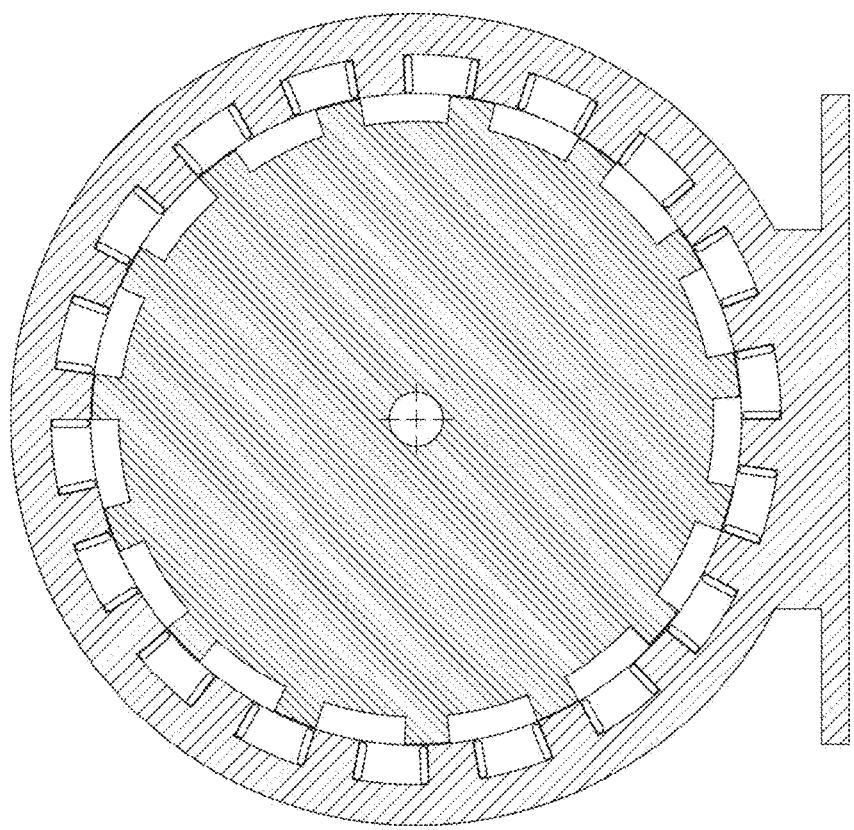
FIG. 8 shows a further alternative configuration of a switch reluctance motor with a rotor ring.

The number of rotor poles and stator poles can vary. In the embodiment shown in FIG. 4, there are 45 rotor poles positioned on the outer circumference of the rotor ring, with 30 stator poles on the inner circumference of the stator ring. The number of each can vary, as seen in FIG. 7, where there are 60 rotor poles and 36 stator poles. There are many combinations of numbers of stator poles and rotor poles that could be configured to work using the circular magnetic flux path in the rotor, as seen in FIG. 8. The number of stator poles and rotor poles as disclosed herein is just an example of three configurations.

The present design will allow a very simple drive system in that a single phase variable frequency AC signal will drive the motor. The ability to drive the present motor with a single phase AC signal does not limit the option of arranging the stator and rotor poles to drive the stator pole electromagnets with one, two, or three phase AC.

This configuration can be driven by a single phase AC signal of either a sine wave, square wave, or other suitable wave by alternately actuating the stator poles. Stator poles (H, N, I, O) make up a complete set for an electrical 360 degree cycle of the motor. The 360 degree electrical cycle of a motor is the degrees of rotor rotation in which a complete electrical cycle is completed and the electrical operation repeats itself. In the motor design as shown in FIG. 4, there is a complete 360 degree electrical cycle in 24 degrees of rotor ring rotation. This means that in 360 degrees of rotor ring rotation there are 15 cycles of 360 degree electrical rotations. Four stator poles allow a complete cycle of two phases to act on the rotor poles. The motor will operate with the actuation of stator poles (H) and (I) in a north-south polarity and then subsequent actuation of stator poles (N) and (O) in a north-south polarity. Alternating between the two set of stator poles in the proper sequence will cause the rotor ring to rotate in a clockwise or counterclockwise rotation with only four stator poles in the sequence. The present improved design of the switched reluctance motor thus allows a partial population of poles on the stator ring. No switched reluctance motor in the prior art has this capability.

Another application of the present design is to function as a switched reluctance stepper motor. In FIG. 4, as discussed above, rotor poles (F) and (G) are in alignment with stator poles (H) and (I), and rotor poles (L) and (M) are in position to be pulled into alignment with stator poles (N) and (O). If the electrical current in stator poles (H) and (I) is DC, the rotor will be held in one fixed position. If the DC current in stator poles (H) and (I) is turned off, and a DC current is applied to stator poles (N) an (O), the rotor will rotate 4 degrees counterclockwise and stop. With the appropriate spacing and geometry of the rotor and stator poles, and suitable application of correctly timed electrical current, the present switched reluctance motor can serve as a stepper motor as well as a variable speed motor.

While FIGS. 4 and 5 shows radial flux pathways, the present invention comprises other possible configurations where the flux path does not run through the full diameter of the rotor or rotor bars. For example, FIG. 2 shows a switched reluctance motor with an axial flux configuration. The rotor poles in this embodiment are magnetic steel and not permanent magnets (representing a significant advantage over the DC brushless design, as described elsewhere herein).

The improved switched reluctance motor designs described above are particular well-suited for low rpm (e.g., around 2000 rpm or below), high torque applications, including, but not limited to, wheel hub motors. The rpm is low because the motor is direct drive to the wheel. High starting torque is desirable.

The noise generated by the improved switched reluctance motor design in accordance with the present invention will be less than prior art designs. The force acting on the stator will always be constant as the attractive magnetic force between the actuated stator poles and corresponding rotor poles will never completely go to zero because of how the motor operates. This will reduce the tendency for vibration in the stator ring.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A switched reluctance wheel hub motor, comprising:
a stator assembly comprising a stator ring with a circumference and a plurality of stator poles extending in one direction from the circumference at an angle to the stator ring, said stator poles actuated by magnetic coils to become electromagnets;
a rotor assembly comprising a rotor ring with a circumference and a plurality of rotor poles located on or proximate the circumference of the rotor, said rotor poles in close proximity to said stator poles, wherein the number of rotor poles is greater than the number of stator poles;
a brake mounting plate positioned between the stator assembly and the rotor assembly;
wherein the rotor assembly is mounted adjacent to a vehicle wheel bearing hub assembly;
wherein a low reluctance magnetic flux path forms through pairs of stator poles and proximal rotor poles when said pairs of stator poles are actuated; and
further wherein said low reluctance magnetic flux path forms through the section of said stator ring between said pair of stator poles and through the section of said rotor ring between said pair of rotor poles.

2. The switched reluctance wheel hub motor of claim 1, wherein said low reluctance magnetic flux path does not pass through the center of the rotor assembly.

3. The switched reluctance wheel hub motor of claim 1, wherein said low reluctance magnetic flux path does not pass through the diameter of the rotor assembly.

4. The switched reluctance wheel hub motor of claim 1, wherein the motor is a two-phased motor.

5. The switched reluctance wheel hub motor of claim 1, wherein the motor is a three-phased motor.

6. The switched reluctance wheel hub motor of claim 1, wherein the actuation of said pair of stator poles pull the pair of rotor poles into alignment with said stator poles.

7. The switched reluctance wheel hub motor of claim 1, wherein pairs of stator poles are sequentially actuated to cause the rotor ring to rotate.

8. The switched reluctance wheel hub motor of claim 1, wherein the motor is a variable speed motor.

9. The switched reluctance wheel hub motor of claim 1, wherein the motor is a stepper motor.

10. The switched reluctance wheel hub motor of claim 1, wherein the rotor ring is disposed on a non-ferromagnetic mechanical support in the center of the rotor ring.

11. The switched reluctance wheel hub motor of claim 1, wherein there are 45 rotor poles and 30 stator poles.

12. The switched reluctance wheel hub motor of claim 11, wherein every other stator pole is actuated at a particular time.

13. The switched reluctance wheel hub motor of claim 1, wherein there are 60 rotor poles and 36 stator poles.

14. The switched reluctance wheel hub motor of claim 13, wherein every third stator pole is actuated at a particular time.

15. The switched reluctance wheel hub motor of claim 1, wherein said motor is driven by a single phase variable frequency AC signal.

16. The switched reluctance wheel hub motor of claim 1, wherein each said low reluctance magnetic flux path forming through a particular section of said stator ring and a particular section of said rotor ring encompasses 4 rotor poles and 3 stator poles.

17. The switched reluctance wheel hub motor of claim 1, wherein each said low reluctance magnetic flux path forming through a particular section of said stator ring and a particular section of said rotor ring encompasses 6 rotor poles and 4 stator poles.

* * * * *